(12) United States Patent
Deng et al.

(10) Patent No.: US 9,954,992 B2
(45) Date of Patent: Apr. 24, 2018

(54) MOBILE DEVICE ENABLED ROBOTIC SYSTEM

(71) Applicant: PURDUE RESEARCH FOUNDATION, West Lafayette, IN (US)

(72) Inventors: Xinyan Deng, Lafayette, IN (US); George T Chiu, West Lafayette, IN (US); Jian Zhang, Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 314 days.

(21) Appl. No.: 14/952,620

(22) Filed: Nov. 25, 2015

(65) Prior Publication Data

US 2017/0201614 A1    Jul. 13, 2017

Related U.S. Application Data

(60) Provisional application No. 62/085,329, filed on Nov. 27, 2014.

(51) Int. Cl.
| | | |
|---|---|---|
| H04B 1/38 | (2015.01) | |
| H04B 7/185 | (2006.01) | |
| H04W 4/00 | (2009.01) | |
| H04M 1/725 | (2006.01) | |
| H04B 1/3827 | (2015.01) | |
| H04W 4/12 | (2009.01) | |
| H04L 12/58 | (2006.01) | |
| B64C 39/02 | (2006.01) | |
| G05D 1/00 | (2006.01) | |

(52) U.S. Cl.
CPC ....... H04M 1/72527 (2013.01); B64C 39/024 (2013.01); G05D 1/0011 (2013.01); H04B 1/3833 (2013.01); H04L 51/32 (2013.01); H04W 4/12 (2013.01); B64C 2201/146 (2013.01); H04M 2250/12 (2013.01)

(58) Field of Classification Search
CPC .................................................. H04M 1/72527
USPC ........................................ 455/557, 517, 519
See application file for complete search history.

(56) References Cited

U.S. PATENT DOCUMENTS

| | | | | |
|---|---|---|---|---|
| 8,930,044 B1* | 1/2015 | Peeters | ................... | B64C 19/00 701/2 |
| 9,747,901 B1* | 8/2017 | Gentry | ................... | G10L 15/22 |
| 2013/0238168 A1* | 9/2013 | Reyes | ................... | B64C 39/024 701/2 |
| 2014/0340995 A1* | 11/2014 | Shimizu | ................. | H04B 13/02 367/131 |

* cited by examiner

*Primary Examiner* — Tilahun B Gesesse
(74) *Attorney, Agent, or Firm* — Purdue Research Foundation

(57) ABSTRACT

An unmanned aerial vehicle (UAV) equipped with sensor modules and mobile devices (including smartphone, tablet) running intelligent software for autonomous navigation, onboard computer vision, communication, and robotic social networks, is disclosed herein.

25 Claims, 5 Drawing Sheets

MOBILE DEVICE ENABLED ROBOTIC SYSTEM

CROSS-REFERENCE TO RELATED APPLICATIONS

The present U.S. patent application is related to and claims the priority benefit of U.S. Provisional Patent Application Ser. No. 62/085,329, filed Nov. 27, 2014, the contents of which is hereby incorporated by reference in its entirety into this disclosure.

TECHNICAL FIELD

The present disclosure generally relates to unmanned aerial vehicles (UAVs), and in particular to UAVs with sensors and mobile device/smartphone onboard as the center for computation, sensor data acquisition and communication.

BACKGROUND

This section introduces aspects that may help facilitate a better understanding of the disclosure. Accordingly, these statements are to be read in this light and are not to be understood as admissions about what is or is not prior art.

Recently, owning to the technical advances in robotics, unmanned aerial vehicles (UAVs) are increasingly popular in many application domains. While UAVs/drones are currently successfully deployed for military applications, their adoption and availability in commercial and civilian domains are currently hindered by its high cost and limited functionalities. The last few years have seen successes of commercial applications emerging in aerial video photography, toy/game and monitoring/surveillances. Functionalities of those systems, however, are still limited to remote control by human and simple point-to-point navigation, and the cost is too high as well. In the meantime, the mobile industry is one of the most rapidly-developing industries, which brings down the cost of portable mobile devices with increasing functionalities. A true disruptive wave of innovation will be facilitated if mobile robotics system (including UAVs) can fully take advantage of what the mobile industry has to offer. The low cost of computation, hardware, and connectivity offered by the mobile industry will be truly beneficial for mobile robotic industry (UAVs included). Moreover, the supporting resources and infrastructures, such as cellular infrastructures and GPS satellites are already available for UAVs to tap into. Therefore, there is an unmet need for the hardware and software integration of mobile device and UAVs and commercialization of the achievable functionalities.

SUMMARY

In one aspect, a system is disclosed, which includes a mobile device coupled to a mobile vehicle. The mobile device can be communicatively coupled to the mobile vehicle, and in yet another embodiment, the mobile device can be physically coupled to the mobile vehicle. The mobile device includes at least one sensor, at least one processor, and at least one communication means. The at least one communication means is capable of communicating and networking among robotic mobile vehicles and between robotic mobile vehicles and humans, using social networking and/or messaging services and accessing, storing, and retrieving information from the Internet. The mobile vehicle includes a chassis, at least one actuator, and a power source. The mobile device can further include at least one actuator and can further include a power source. The mobile device can also be configured to gain power from the power source of the mobile vehicle. The mobile device can also be configured to gain power from the power source from the mobile device itself.

In another aspect, the mobile vehicle can be a robot, an unmanned aerial vehicle, a humanoid an unmanned land vehicle, an unmanned underwater vehicle, and/or an unmanned watercraft. The mobile device can be a mobile phone, a smartphone-type device, and/or a tablet.

In yet another aspect, a system is presented which includes at least one robot that is configured to communicate with at least one target. The system also includes at least one communication means, wherein the communication means is capable of communicating and networking among robotic mobile vehicles and between robotic mobile vehicles and humans, using human social networking and/or messaging services and accessing, storing, and retrieving information from the Internet and/or dedicated robot social networking and/or messaging services, which include intelligent software applications run on a mobile device. The mobile device is attached to a vehicle, and the mobile device is capable of decision making, autonomous navigation and social interactions among robots and between robot and human, which can be accomplished onboard and/or through cloud computing. The target can include a human and/or a robot. The robot can be an autonomous robot and/or a home appliance and/or an autonomous vehicle.

In yet another aspect, a method of communication and networking among robotic mobile vehicles and between robotic mobile vehicles and humans using human social networking or dedicated robot social networking methods is presented. The method includes running an intelligent software application on a mobile device, wherein the mobile device is attached to a vehicle. The mobile device is capable of decision making, autonomous navigation and interactions among robots and between robot and human. The human social networking can include at least one human interacting with at least one robot to achieve a natural and intelligent interaction. The dedicated robot networking includes at least one robot interacting with at least one other robot to achieve networking interaction.

In yet another aspect, a method of communication and networking among robotic mobile vehicles and between robotic mobile vehicles and humans using messaging services or dedicated robotic messaging services, comprising running an intelligent software application on a mobile device, wherein the mobile device is attached to a vehicle, and wherein the mobile device is capable of decision making, autonomous navigation and interactions among robots and between robot and human. The messaging services can include at least one human interacting with at least one robot to achieve a natural and intelligent interaction. The dedicated robotic messaging services can include at least one robot interacting with at least one other robot to achieve networking interaction.

DETAILED DESCRIPTION

Figure 1:
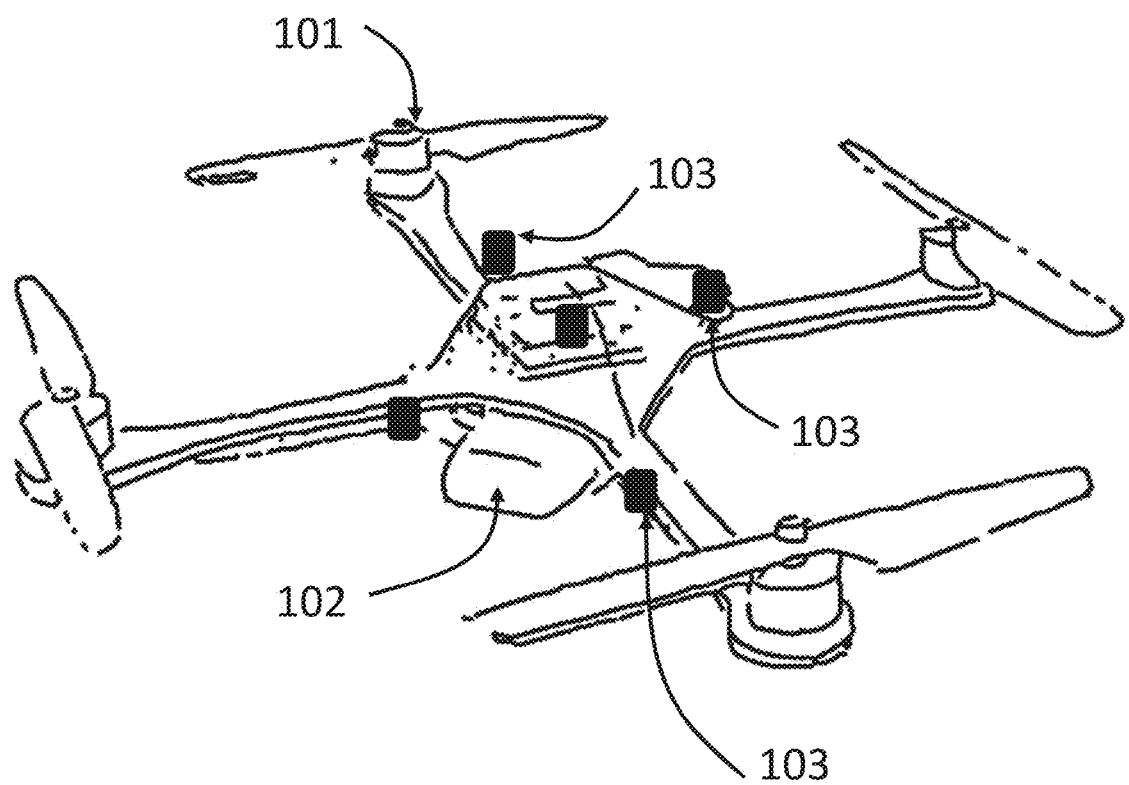
FIG. 1 is a diagram showing an embodiment of the hardware architecture disclosed herein.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A low-cost unmanned aerial vehicle (UAV) equipped with sensor modules and mobile devices (for instance, a smartphone or tablet) running intelligent software for autonomous navigation, onboard computer vision, communication, and robotic social networks, is disclosed herein. The sensor modules include but are not limited to cameras, radar, LIDAR, ultrasonic range sensors, night vision cameras, stereovision systems, laser range finder, pressure sensors, altimeter to measure various environment information such as obstacle detection, distance to the obstacle, recognition of other objects in front and around the vehicle, point cloud map/3D mapping of surroundings, therefore provide possible sensing for functions of obstacle avoidance, boundary following, collision avoidance, and autonomous navigation. The mobile device/smartphone serves as the center of computation, sensor data acquisition, storage and analysis, connectivity through cellular network, RF communication (such as Bluetooth and Wi-Fi). The camera of the mobile device can work as the primary or one of the image acquisition sensors. The software running on the mobile device includes but not limited to navigation planning algorithms, image processing/computer vision algorithms, sensor data analysis, trajectory planning algorithms, connectivity to the cloud, and GUI. The software architecture includes three layers: a high level layer hybrid automata switching between behaviors such as robotic social networking, artificial intelligent planning(including for instance, reading in map and GPS and generating intermediary waypoints); a middle level layer hybrid automata generating trajectory and avoiding obstacle between waypoints; a low level layer trajectory tracking and flight stabilization feedback controller. The hardware architecture includes three parts: the unmanned aerial vehicle (with/without onboard low level stabilizing controller), variety of sensor modules attached to the unmanned aerial vehicle, and a mobile device including cellar connectivity, camera, GPS, CPU, storage, RF communication (Wi-Fi, Bluetooth), attached to the unmanned aerial vehicle. For purposes of the present disclosure, social networking refers to platforms and services designed for building online communities and communication and interaction capabilities. Most social networks are web-based and provide ways for users to interact and communicate. In addition, for the purposes of the present disclosure, messaging services means textual and/or pictorial and/or visual communication between users. Each message has an originator and at least one recipient. The originator can be a human and/or a social network, and/or a robot. The users and the at least one recipient can similarly be humans and/or social networks, and/or robots. Further, for purposes of the present disclosure, a robot refers to a reprogrammable, multifunction manipulator designed to move materials, which can include, parts, tools, humans, living creatures, and/or specialized devices. This can be accomplished through variable programmed motions for the performance of a variety of tasks.

Hardware of the novel system featuring the mobile device(s) (such as a smartphone), the robot (such as UAV), and wireless (or wired) sensor modules, is presented here. The sensors are communicatively coupled to the mobile device(s) and/or UAV's electronics. The sensor readings are collected and analyzed using algorithms, which compute useful information for the navigation system. The mobile device sends out commands to drive the UAV. It should be appreciated that although a smartphone is presented as an embodiment, a mobile device as used herein can be a smartphone-type device, a tablet, and similar devices that exhibit communication, sensing and computing power similar to a smartphone-type device.

The hardware architecture is disclosed herein. In one embodiment, referring to FIG. 1, a plurality of sensor modules 103 (FIG. 1) is placed in predetermined locations on the vehicle. The mobile device 102 (including for example, a smartphone) is physically attached onto the body of the UAV.

Figure 2:
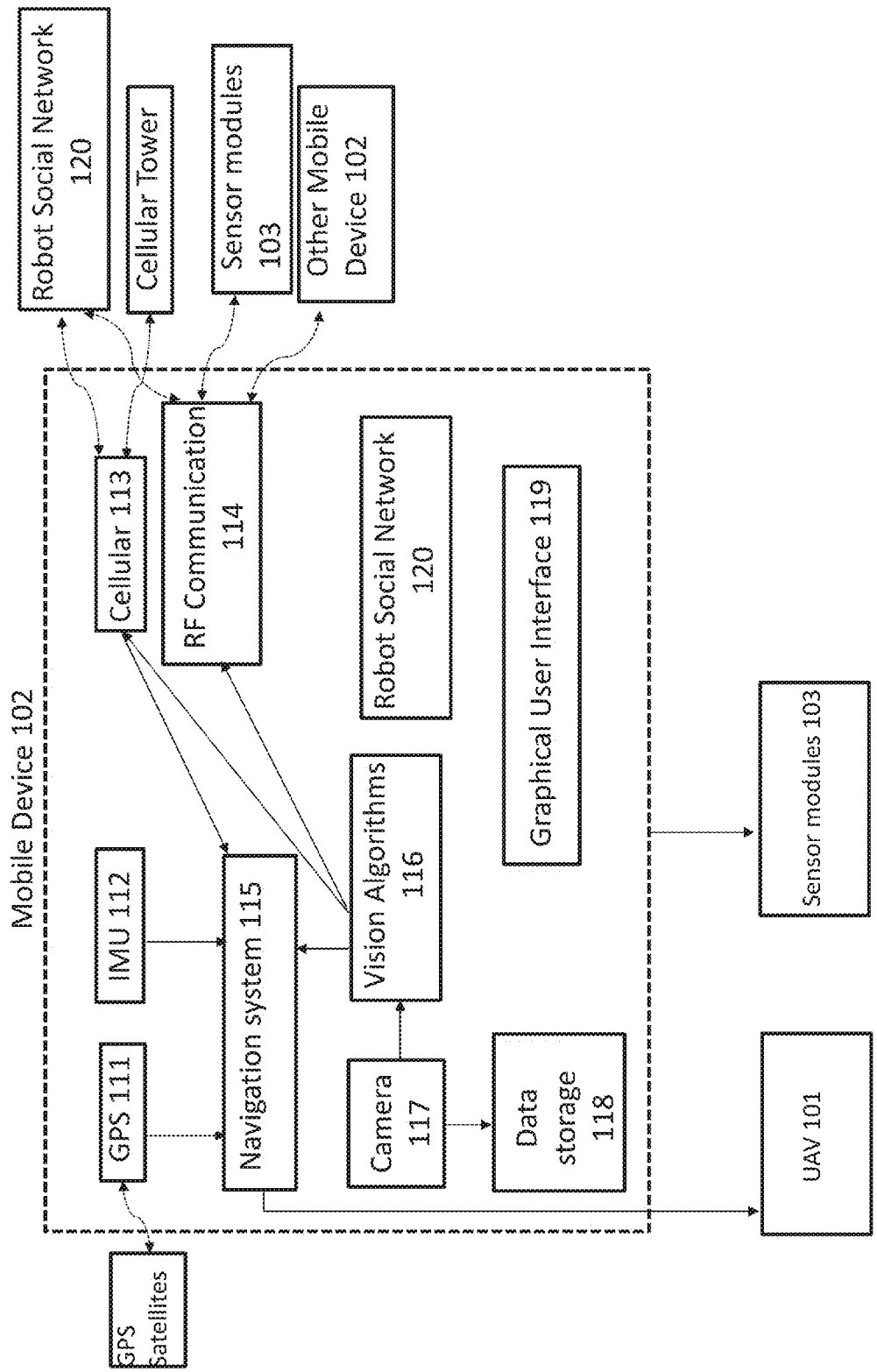
FIG. 2 is a system diagram of one embodiment of the herein described system.

Referring to FIG. 2 for the system diagram, in one embodiment, the mobile device (including for example, a smartphone) serves as the center of computation with its CPU, memory and data storage. It also provides sensor data acquisition for its own sensors (such as GPS, IMU, temperature and Camera) and outside sensor modules 103. Sensor modules 103 can include but are not limited to cameras, radar, LIDAR, ultrasonic range sensors, night vision cameras, stereovision systems, laser range finder, pressure sensors, and altimeters etc. The navigation system 115 as a software bundle running on the mobile phone takes in the sensor readings and generates command to drive UAV 101. The phone camera 117 records the video of the surroundings and feeds the data to either data storage 118 or upload through cellular network 113 to online storage or online website, or to the computer vision algorithms 116. The computer vision algorithms 116 provide analysis of the visional data and generate information to be used by navigation system 115. A graphical user interface (GUI) 119 is also provided through the phone's touch screen for possible interaction with operator or people. The robot social network 120 provides the arena of communication among group of UAVs or between human and UAVs.

Figure 3:
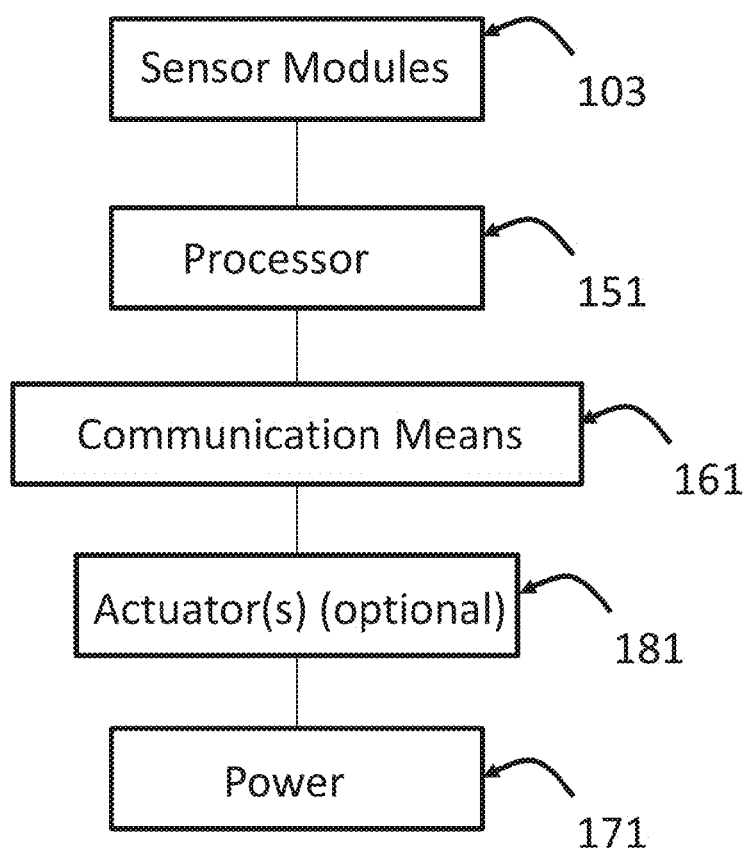
FIG. 3 is a system diagram of an embodiment of the herein described mobile device.

Referring to FIG. 3, a system diagram for an embodiment of the mobile device 102 is shown. Still referring to FIG. 3, sensor modules 103 are coupled to a processor 151, which is further coupled to a communication means 161. The mobile device 102 can also optionally include at least one actuator 181. A power source 171 supplies power to the mobile device 102. The mobile device 102 can be any one of or a combination of a smartphone, a tablet, or a personal digital assistant. In some aspects the power source 171 can be any one of or a combination of a battery, solar power, or even mechanical power.

Figure 4:
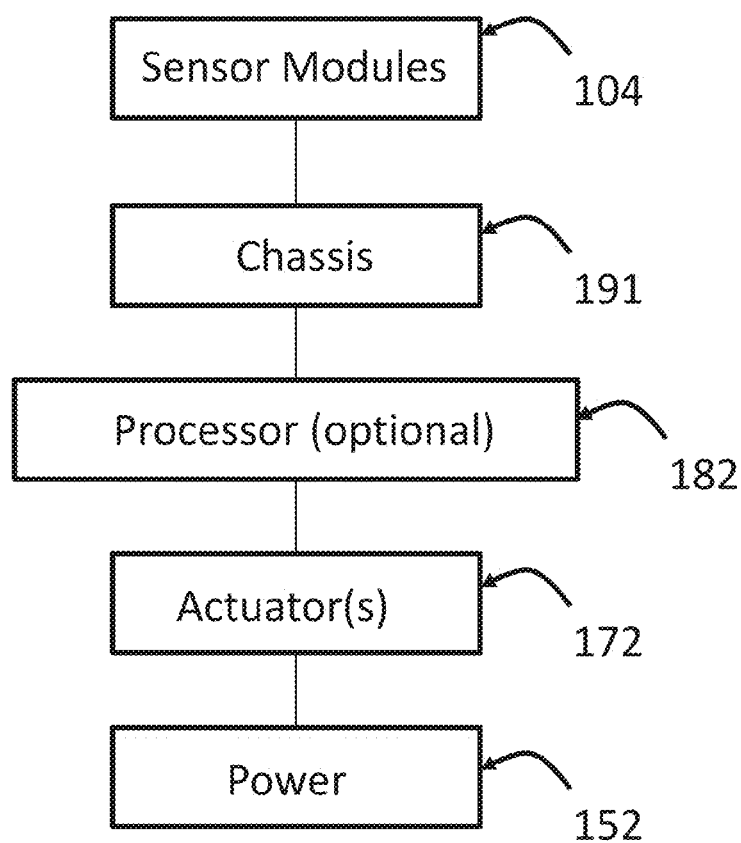
FIG. 4 is a system diagram of an embodiment of the herein described mobile vehicle.
Figure 5:
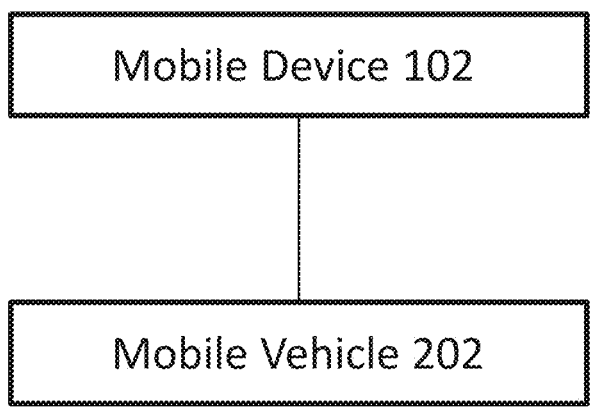
FIG. 5 is a system diagram of an embodiment of the herein described system.

Referring to FIG. 4, a system diagram for an embodiment of the mobile vehicle 202 is shown. Still referring to FIG. 4, the mobile vehicle 202 includes a sensor module 104, which is coupled to a chassis 191. The mobile vehicle 202 can also include at least one actuator 172. The mobile vehicle 202 can also optionally include a processor 182. The mobile device 202 also includes a power source 152. The mobile vehicle 202 can be any one of or a combination of a robot, a humanoid, a car, a UAV, or even an underwater vehicle. Referring to FIG. 5, in one embodiment, the mobile device 102 and the mobile vehicle 202 can be physically and/or communicatively coupled. In some aspects the power source 152 can be any one of or a combination of a battery, solar power, or even mechanical power.

Referring to FIG. 2, the software architecture (not shown) for the navigation system 115 can include three layers: a high level layer hybrid automata switching between behaviors such as task planning, artificial intelligent planning (including for example, reading in map and GPS and generating intermediary waypoints); a middle level layer hybrid automata generating trajectory and avoiding obstacle between waypoints; a low level layer trajectory tracking and flight stabilization feedback controller.

For sensing, in one embodiment, for widely available computation power, the mobile device 102, such as a smartphone-type device or a tablet device, is the center for higher-level image processing and/or computer vision algorithms and/or sensor fusion algorithms. In yet another embodiment, robust ultrasonic range sensors may be used to achieve obstacle and collision avoidance. In yet another embodiment, LIDAR is used to make high-resolution maps.

For system mapping and localization, in one embodiment, the map of for the navigation system 116 is downloaded from existing Map services such as Google Map® and TomTom® for real-time navigation and traffic information. In yet another embodiment, the map is constructed along the way with onboard sensor and mapping algorithms. In yet another embodiment, Bluetooth and/or Wi-Fi and/or cellular are used for localization for the position or relative position of the UAVs. Thus formation control of UAVs is realized. In yet another embodiment, SLAM (simultaneous localization and mapping) is used to acquire the mapping and system location without using GPS and map services.

For communication between human and robots, in one embodiment, the robot social network is used, where either existing social network such as Facebook®, twitter® and any other human online social networking methods are adopted. Thus in this embodiment, a human user can send command or to-do-list for the robot via online messaging, status posting, and/or hash tagging or any other existing methods that are used by human on the online social networks. The robot can do social updates using similar existing methods to messaging or update the current status via words, photos and/or videos. In another embodiment, the communications between robot and human are thought the existing methods of text message and phone call between mobile phones.

For communication and networking between robots, in one embodiment, the robot social network is used, where either existing social network such as Facebook®, Twitter® and any other human online social networking methods are adopted. Thus in this embodiment, robots can send command or to-do-list for the other robot via online messaging, status posting, and/or hash tagging or any other existing methods that are used by human on the online social networks. The robot can do social updates using similar existing methods to messaging or update the current status via words, photos and/or videos. In another embodiment, the communications among robots are through the existing methods of text message and phone call between mobile phones. In yet another embodiment, the communications among robots are using Bluetooth networks. In yet another embodiment, the communications among robots are using Wi-Fi networks.

In yet another embodiment, a system is disclosed, which includes a mobile device coupled to a mobile vehicle. The mobile device can be communicatively coupled to the mobile vehicle, and in yet another embodiment, the mobile device can be physically coupled to the mobile vehicle. The mobile device includes at least one sensor, at least one processor, and at least one communication means. The at least one processor is configured to make operational decisions through local or cloud-based computing. The at least one communication means is capable of communicating and networking among robotic mobile vehicles and between robotic mobile vehicles and humans, using social networking and/or messaging services and accessing, storing, and retrieving information from the Internet. The mobile vehicle includes a chassis, at least one actuator, and a power source. The mobile device can further include at least one actuator and can further include a power source. The mobile device can also be configured to gain power from the power source of the mobile vehicle. The mobile device can also be configured to gain power from the power source from the mobile device itself.

In yet another embodiment, the mobile vehicle can be a robot, an unmanned aerial vehicle, a humanoid an unmanned land vehicle, an unmanned underwater vehicle, and/or an unmanned watercraft. The mobile device can be a mobile phone, a smartphone-type device, and/or a tablet.

In yet another embodiment, a system is presented which includes at least one robot that is configured to communicate with at least one target. The system also includes at least one communication means, wherein the communication means is capable of communicating and networking among robotic mobile vehicles and between robotic mobile vehicles and humans, using human social networking and/or messaging services and accessing, storing, and retrieving information from the Internet and/or dedicated robot social networking and/or messaging services, which include intelligent software applications run on a mobile device. The mobile device is attached to a vehicle, and the mobile device is capable of decision making, autonomous navigation and social interactions among robots and between robot and human, which can be accomplished onboard and/or through cloud computing. The target can include a human and/or a robot. The robot can be an autonomous robot and/or a home appliance and/or an autonomous vehicle.

In yet another embodiment, a method of communication and networking among robotic mobile vehicles and between robotic mobile vehicles and humans using human social networking or dedicated robot social networking methods is presented. The method includes running an intelligent software application on a mobile device, wherein the mobile device is attached to a vehicle. The mobile device is capable of decision making, autonomous navigation and interactions among robots and between robot and human. The human social networking can include at least one human interacting with at least one robot to achieve a natural and intelligent interaction. The dedicated robot networking includes at least one robot interacting with at least one other robot to achieve networking interaction.

In yet another embodiment, a method of communication and networking among robotic mobile vehicles and between robotic mobile vehicles and humans using messaging services or dedicated robotic messaging services, comprising running an intelligent software application on a mobile device, wherein the mobile device is attached to a vehicle, and wherein the mobile device is capable of decision making, autonomous navigation and interactions among robots and between robot and human. The messaging services can include at least one human interacting with at least one robot to achieve a natural and intelligent interaction. The dedicated robotic messaging services can include at least one robot interacting with at least one other robot to achieve networking interaction.

The herein disclosed systems and methods can be easily integrated into any existing vehicle (including ground vehicles and aerial vehicles) and will thereby permit low-cost transformation of existing mobile robotics system (including UAVs) into an intelligent system with aforementioned advanced functionalities. It should be appreciated that although ground and aerial vehicles are disclosed as embodiments, these ground vehicles and aerial vehicles are not limited to inanimate objects. Animate users (including animals and humans) may be the vehicles as well. In addition, although referenced is made herein to "mobile" robots, such use is not intended to be limiting and rather, the robots can include stationary robots as well.

EXAMPLE 1

Human-Robot Interactions

As an example of the herein described systems and methods, a human user may need to accomplish household chores, for instance, grocery shopping. Using the herein described system and method, the user can provide instructions to a mobile device, for example "pick up groceries" and will list the groceries needed. The mobile device sends the instructions (which can include using natural language) to a robot (which can be either autonomous or human-driven), such as a car. The car can then be alerted that groceries need to be picked up and can act on those instructions. Other examples include laundry and house cleaning.

There are at least two ways in which such interactions can occur: through messaging services and/or through social interactions. These messaging services are defined to include email and instant messaging, and short messaging services.

EXAMPLE 2

Robot-Robot Interactions

Another example of the herein described systems and methods involves robots interacting with other robots from human instructions. As an example, if a task, such as the lawn on a human user's house needs to be mowed, the instructions can be sent to a robot, which can then interact with other robots using a social media network to optimize accomplishing acting on the instructions to finish the task. The robots and the human user can all then be kept updated through a social media network on the progress of the task. There are at least two ways in which such interactions can occur: through dedicated robotic social networking and/or messaging services, and/or human social media and messaging service interactions. These messaging services are defined to include email and instant messaging, and short messaging services.

Those skilled in the art will recognize that numerous modifications can be made to the specific implementations described above. The implementations should not be limited to the particular limitations described. Other implementations may be possible.

The invention claimed is:

1. A system, comprising:
   a mobile device, wherein the mobile device comprises:
   at least one sensor;
   at least one processor;
   at least one communication means, wherein the communication means is capable of communicating and networking among robotic mobile vehicles and between robotic mobile vehicles and humans, using social networking and/or messaging services and accessing, storing, and retrieving information from the Internet; and
   a mobile vehicle, wherein the mobile vehicle is physically coupled to the mobile device, and the mobile vehicle comprises:
   a chassis;
   at least one actuator; and
   a power source.

2. The system of claim 1, wherein the mobile device further comprises at least one actuator.

3. The system of claim 1, wherein the mobile device further comprises a power source.

4. The system of claim 1, wherein the mobile device is configured to gain power from the power source of the mobile vehicle.

5. The system of claim 1, wherein the mobie device is configured to gain power from the power source of the mobile device.

6. The system of claim 1, wherein the mobile vehicle is a robot.

7. The system of claim 1, wherein the mobile vehicle is an unmanned aerial vehicle.

8. The system of claim 1, wherein the mobile vehicle is a humanoid.

9. The system of claim 1, wherein the mobile vehicle is an unmanned land vehicle.

10. The system of claim 1, wherein the mobile vehicle is an unmanned underwater vehicle.

11. The system of claim 1, wherein the mobile vehicle is an unmanned watercraft.

12. The system of claim 1, wherein the mobile device is a mobile phone.

13. The system of claim 1, wherein the mobile device is a tablet.

14. The system of claim 1, wherein the mobile device is communicatively coupled to the mobile vehicle.

15. A system, comprising:
   at least one robot, wherein the at least one robot is configured to communicate with at least one target;
   at least one communication means, wherein the communication means is capable of communicating and networking among robotic mobile vehicles and between robotic mobile vehicles and humans, using human social networking and/or messaging services and accessing, storing, and retrieving information from the Internet and/or dedicated robot social networking and/or messaging services, comprising intelligent software applications run on a mobile device, wherein the mobile device is attached to a vehicle, and wherein the mobile device is capable of decision making, autonomous navigation and social interactions among robots and between robot and human, and wherein the vehicle comprises an actuator.

16. The system of claim 15, wherein the at least one target comprises a human.

17. The system of claim 15, wherein the at least one target comprises a robot.

18. The system of claim 17, wherein the robot is an autonomous robot.

19. The system of claim 18, wherein the autonomous robot is a home appliance and/or an autonomous vehicle.

20. A method of communication and networking among robotic mobile vehicles and between robotic mobile vehicles and humans using human social networking or dedicated robot social networking methods, comprising running an intelligent software application on a mobile device, wherein the mobile device is attached to a vehicle, and wherein the mobile device is capable of decision making, autonomous navigation and interactions among robots and between robot and human, wherein the vehicle comprises an actuator.

21. The method of claim 20, wherein the human social networking comprises at least one human interacting with at least one robot to achieve a natural and intelligent interaction.

22. The method of claim 20, wherein the dedicated robot networking comprises at least one robot interacting with at least one other robot to achieve networking interaction.

23. A method of communication and networking among robotic mobile vehicles and between robotic mobile vehicles and humans using messaging services or dedicated robotic messaging services, comprising running an intelligent software application on a mobile device, wherein the mobile device is attached to a vehicle, and wherein the mobile device is capable of decision making, autonomous navigation and interactions among robots and between robot and human, wherein the vehicle comprises an actuator.

24. The method of claim 23, wherein the messaging services comprise at least one human interacting with at least one robot to achieve a natural and intelligent interaction.

25. The method of claim 23, wherein the dedicated robotic messaging services comprises at least one robot interacting with at least one other robot to achieve networking interaction.

* * * * *